(No Model.) 2 Sheets—Sheet 2.
J. M. BROMLEY.
VEHICLE GEAR.
No. 523,066. Patented July 17, 1894.
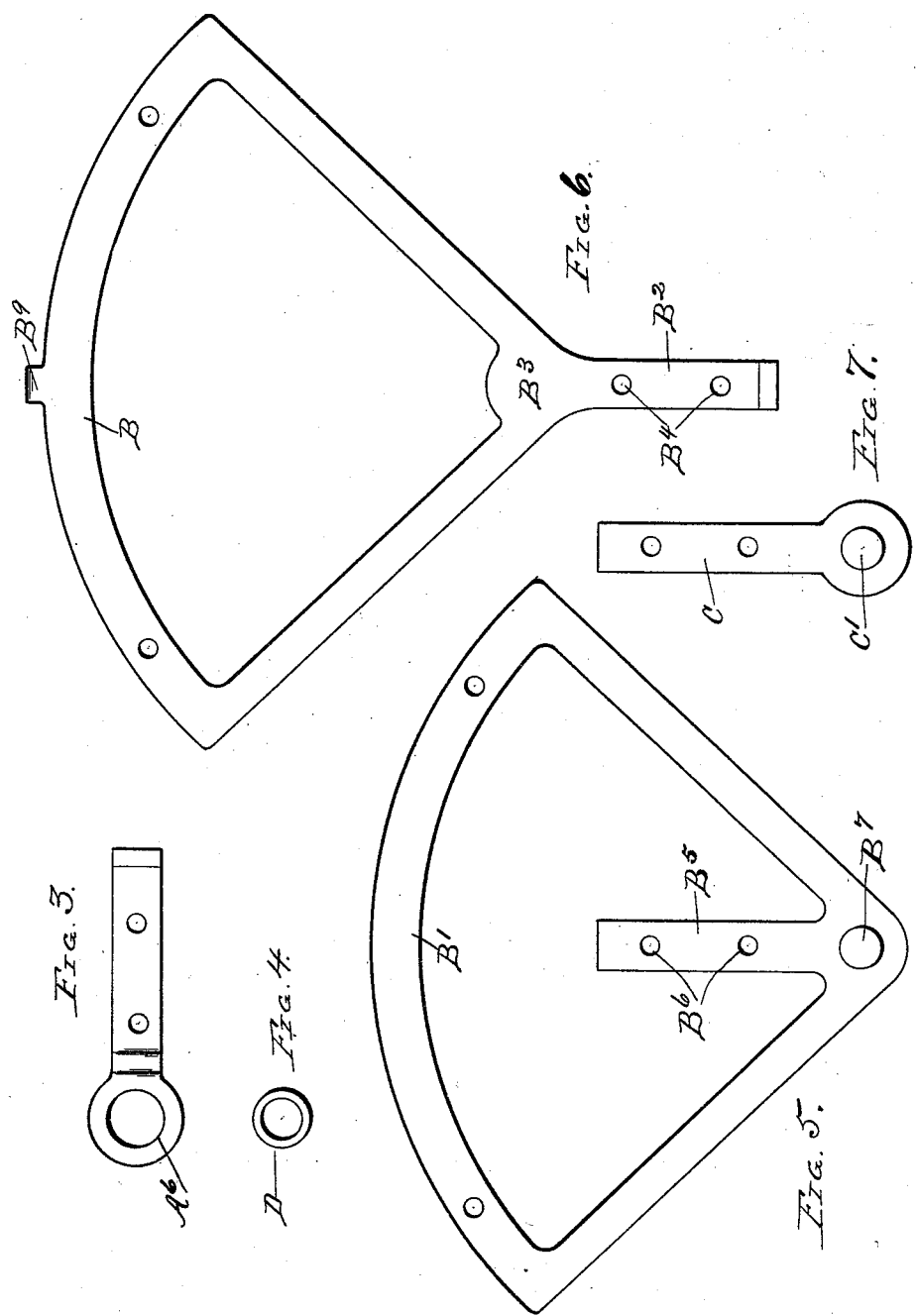
Witnesses:
B. W. File
Geo. H. Gibson
Inventor:
James M. Bromley
by Mosher & Curtis
attys.

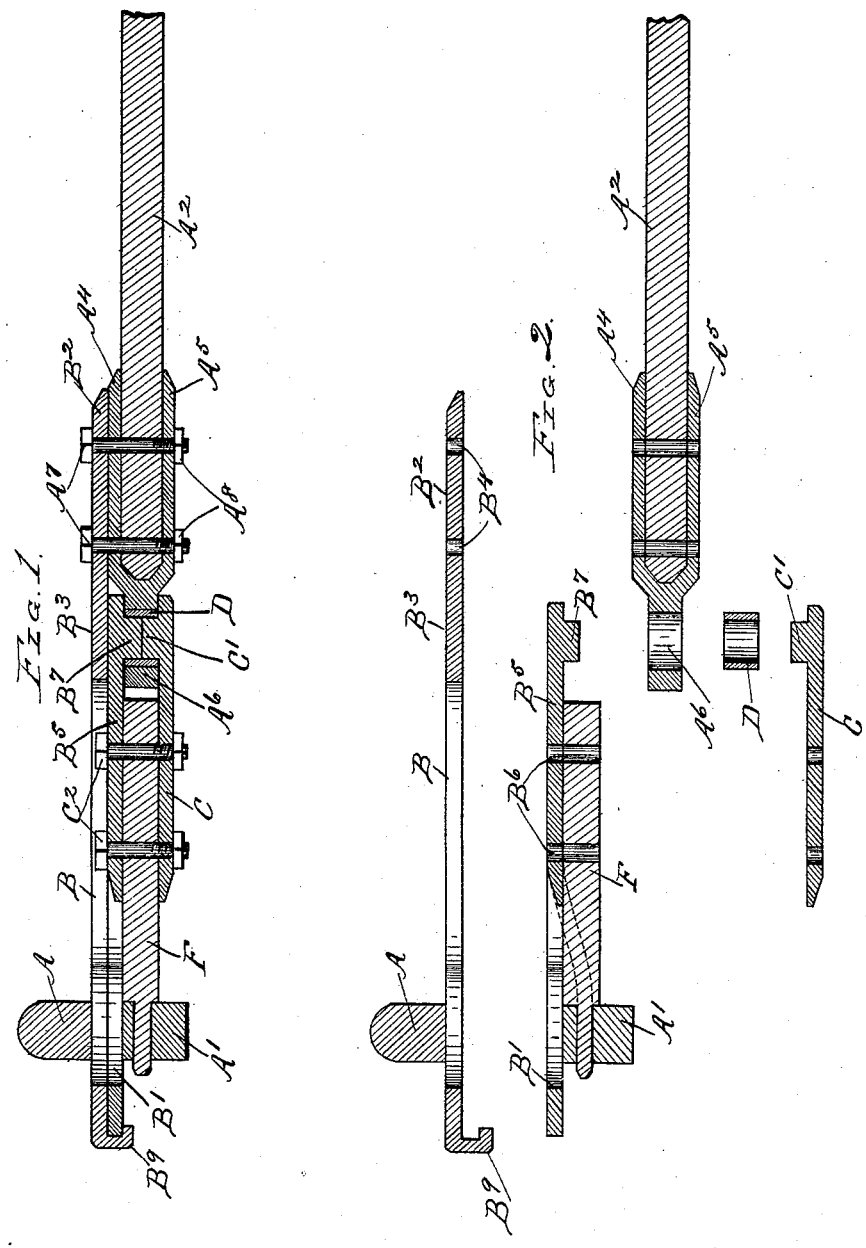

UNITED STATES PATENT OFFICE.

JAMES M. BROMLEY, OF PLATTSBURG, NEW YORK.

VEHICLE-GEAR.

SPECIFICATION forming part of Letters Patent No. 523,066, dated July 17, 1894.

Application filed September 9, 1893. Serial No. 485,139. (No model.)

*To all whom it may concern:*

Be it known that I, JAMES M. BROMLEY, a citizen of the United States, residing at Plattsburg, county of Clinton, and State of New York, have invented certain new and useful Improvements in Vehicle-Gears, of which the following is a specification.

My invention relates to such improvements and consists of the novel construction and combination of parts hereinafter described and subsequently claimed.

Reference may be had to the accompanying drawings, and the letters of reference marked thereon, which form a part of this specification.

Similar letters refer to similar parts in the several figures therein.

Figure 1 of the drawings is a vertical longitudinal middle section of my improved vehicle-gear. Fig. 2 is a similar view showing the several parts separated from each other, but occupying the same positions relatively to a vertical line, as that shown in Fig. 1. Fig. 3 is a top plan view of the eye-iron detached from the reach. Fig. 4 is an end view of the eye-bushing detached. Fig. 5 is a bottom plan view of the under fifth-wheel structure. Fig. 6 is a top plan view of the upper fifth-wheel structure. Fig. 7 is a top plan view of the lower or detachable hook-iron detached.

My invention relates especially to the fifth-wheel mechanism in which the fifth-wheel centers are located in rear of the forward axle to facilitate a short turn of the vehicle.

The object of my invention is to produce a strong and compact gear that will be both ornamental and durable.

I have shown only such parts as will be useful for a full understanding of my invention.

$A$— is the head-block, $A'$— the forward axle, and $A^2$— the reach-pole with the rear end broken away, the rear axle not being shown.

$B$— is the upper fifth-wheel member or structure, and $B'$— the lower fifth-wheel structure.

The forward end of the reach-pole is provided with an eye-iron having the bifurcate arms $A^4$—, $A^5$—, adapted to receive the forward end of the pole between them, and with an eye, $A^6$— in its forward end.

The eye-iron and the upper fifth-wheel structure are both rigidly secured to the pole by means of the screw-threaded bolts $A^7$— and nuts $A^8$—, as shown in Fig. 1, the fifth-wheel structure being provided with the arm $B^2$— projecting rearwardly of its center $B^3$— and having the bolt-holes $B^4$—.

The brace F— has its forward end mortised into the bed of the forward axle and projects rearwardly in line with the reach-pole.

The lower fifth-wheel structure is provided with a brace-iron $B^5$— which projects forwardly from its hub approximately in line with the reach-pole having two bolt-holes $B^6$— by which the structure is bolted to the upper side of the brace, as shown in Fig. 1. This structure is also provided at its center with a hook $B^7$— projecting downwardly and adapted to enter and fit the upper end of the eye on the reach, or the eye-bushing when a bushing is employed as hereinafter explained.

Bolted to the lower side of the brace is the hook-iron C— having a hook $C'$— projecting upwardly from the upper side of the iron and adapted to enter and fit the lower end of the eye. This hook-iron and the brace-iron are both secured to the brace by the same bolts $C^2$—.

The brace-iron may be extended so as to reach the bed-piece of the forward axle, and be secured directly thereto, as indicated by dotted lines in Fig. 2, in which case a separate brace could be dispensed with.

One of the fifth-wheel structures is provided with one or more hooks $B^9$— adapted to inclose the other structure and keep them in engagement with each other.

My improved form of construction, as seen in Fig. 1, is made very compact and strong, the principal parts extending in straight horizontal lines and occupying horizontal planes directly in, or in close proximity to, the line of draft, which is in line with the reach. There are no crooks nor curved offsets to be drawn out of shape or bent by collision with foreign objects.

The bushing D— inserted in the eye of the reach is preferably made of a softer metal than the eye-iron and the hook-irons to take the wear due to movement of the parts upon each other, and when worn it can easily be replaced, it only being necessary to remove the nuts on bolts $C^2$— and detach the hook-iron C— to make the bushing accessible and removable.

What I claim as new, and desire to secure by Letters Patent, is—

1. In a vehicle-gear, the combination with an upper fifth-wheel structure, and a reach-pole rigidly connected therewith in rear of its center, of a lower fifth-wheel structure, a brace rigidly secured to the lower fifth-wheel structure and the bed-piece of the forward axle, extending rearwardly from the axle to the reach-pole in line with the pole, and a pivotal connection between the pole and the rigidly-connected brace and fifth-wheel structure, located in rear of the axle and in axial line with the centers of the fifth-wheel structures, substantially as described.

2. In a vehicle-gear, a pivotal connection between the reach-pole and a brace extending rearwardly from the forward axle to, and in line with, the pole, consisting of an eye-iron secured to the forward end of the pole in line therewith, and a pair of hook-irons secured to opposite sides of the brace with the hooks resting in the opposite ends of the eye, substantially as described.

3. In a hook-and-eye connection between a vehicle-reach and oscillatory brace, the combination with an eye-iron secured to one of such parts, of a detachable bushing inserted in the eye, and a detachable hook-iron having a hook adapted to fit the bushing, secured to the other of such parts, substantially as described.

In testimony whereof I have hereunto set my hand this 26th day of August, 1893.

JAMES M. BROMLEY.

Witnesses:
A. JENNIE MAC NEIL,
HANNAH L. MAC NEIL.